United States Patent Office 2,758,084
Patented Aug. 7, 1956

2,758,084

WATER PURIFICATION PROCESS

Alden J. Deyrup and John R. Mills, Niagara Falls, N. Y., assignors to E. I. du Pont de Nemours and Company, Wilmington, Del., a corporation of Delaware No Drawing. Application June 5, 1953, Serial No. 359,957

7 Claims. (Cl. 210—23)

This invention relates to purifying water contaminated by organic materials such as industrial wastes and more particularly to purifying such water by means of soluble inorganic ferrates.

Pollution of streams and other national water resources has become a problem of major proportions as a result of the increases in population and industrialization of recent decades. Manufacturing plants spend millions of dollars each year decontaminating their waste water before returning it to rivers or drainage systems serving them. Municipalities, however, must still spend additional millions before natural waters are made fit for public use.

Among the most poisonous materials that can be drained into the waterways are the cyanides. Wastes from electroplating establishments frequently contain these compounds which must be destroyed before the effluent can be discharged. This destruction may be quite a difficult task, especially as many public water specifications require that cyanide content of any water discharged be less than 0.5 part per million (p. p. m.). Chlorination may be used to eliminate cyanide but is expensive and may introduce new contamination problems. At concentrations of a few parts per million, excess chlorine, for example, may be more destructive to fish and other marine life than the cyanide destroyed by its use. Chlorine, furthermore, may react with substances frequently present in water, such as phenols, to yield undesirable and ill-tasting products. Chlorophenols are often formed in this manner by the chlorination procedures employed in public water-works and render the water so treated almost unfit for consumption.

A primary object of this invention is development of a process for purifying water. Another object of the invention is development of a process for rendering potable water otherwise unfit to drink. Another object is development of a process for improving waste water contaminated with cyanides. An additional object of the invention is development of a method for destroying chlorophenols in water. A further object of the invention is development of a method for purifying industrial wastes.

We have found that the above-mentioned and other objectives of the invention can be achieved by a process in which contaminated water is treated with a ferrate. The temperature of the treatment is not critical, ambient or room temperatures being quite satisfactory. Decomposition of the ferrates increases rapidly above 50° C. so temperatures above 50° C. should preferably not be used. Soluble ferrates in general may be employed in the process but the alkali metal salts such as potassium ferrate are preferred. While solid ferrate may be added directly to the polluted water, control of the reaction can sometimes be improved by adding the ferrate in the form of a solution. As usually made up ferrate solutions are either too alkaline to be of practical utility or decompose about as fast as the solid dissolves. There is disclosed, however, in patent application S. N. 359,879 of Mills and Smith filed of even date and of common assignment herewith, a method for making stable ferrate solutions. Ferrate solutions as prepared in the copending case therefore constitute the preferred medium for purifying water in accordance with the present invention.

As disclosed in the above-mentioned copending application, ferrate solutions remain stable for up to about twenty hours if they contain certain phosphates, of which alkali metal orthophosphates and triphosphates are preferred. The ratio of phosphate to ferrate utilized should generally be about 1:1 at a concentration about 0.1 molar with respect to ferrate. Other concentrations and ratios may be used but those mentioned are preferred. Also preferred is use of a buffer, as for example a sodium borate, to maintain the solution at a pH of about 8.95.

Additional details of the invention will be understood from the following examples:

*Example 1*

A solution containing one hundred parts per million of o-chlorophenol was made up by dissolving 0.100 g. of the liquid in one liter of water. A ten milliliter aliquot of this solution was then diluted to one liter to yield a solution containing one part per million. This very dilute solution still retained a definite phenolic odor. To three 200 ml. samples of the one part per million solution the following additions were made: (a) 1.25 ml. of sodium borate-sodium orthophosphate solution, 0.1 M in both borate and orthophosphate and with a pH of 8.95; (b) 1.2 ml. of 0.10 M potassium ferrate dissolved in the 0.1 M solution of (a) at pH 8.95 and containing the equivalent of ten parts per million of 78% potassium ferrate; and (c) 0.0023 g. of 78% solid potassium ferrate making up a solution containing about 10 p. p. m. of the ferrate.

The first solution retained its phenolic odor unchanged. The two other solutions reacted rapidly with the added ferrate as indicated by the disappearance of the characteristic purple color. No offensive odor of phenol could be detected in either treated solution at the end of five minutes. A faint yellow coloration appeared, however, after the ferrate treatment, due to the ferric compounds produced.

*Example 2*

Tests were made on solutions containing twenty parts per million of sodium cyanide to determined whether toxicity can be destroyed by potassium ferrate. Cyanide solutions of the concentration tested here are frequently encountered in the wastes from electroplating operations.

To 250 ml. of the solution containing 20 p. p. m. was added sufficient solid potassium ferrate to give a concentration of 200 p. p. m. of the latter compound. Reaction was immediately apparent, the color changing from purple to dark red. At the end of ten minutes a two-fold excess of potassium iodide was added to destroy excess ferrate in the solution. In order to analyze the solution for cyanide, it was then acidified and hydrogen cyanide distilled therefrom. Cyanide was determined in the distillate by titration with silver nitrate, a rhodanine indicator being employed. A total of 0.26 p. p. m. cyanide was found, a figure well below the tolerable 0.5 p. p. m. A control soluton to which no ferrate addition had been made was also analyzed. The control showed 18.1 p. p. m. sodium cyanide.

In addition to the two impurities specifically exemplified, other materials as well can be destroyed by the ferrates. In fact, contaminating organic chemicals destructible by such agents as chlorine dioxide may broadly be oxidized and rendered inoffensive by ferrates. The ferrates can then be used generally as water purification agents, either for destroying industrial wastes or for creating potable water for public supplies.

The quantity of ferrates employed may be varied greatly. No less than the stoichiometric quantity needed to oxidize to carbon dioxide all undesirable organic matter should usually be employed. Usually, however, the oxidizing agent should be employed in great excess, that is in amounts ranging up to ten times the weight of the material it is desired to destroy. In the case of such toxic materials as sodium cyanide, generally present in very minute quantities, even up to one hundred times the weight of the contaminant may be used.

For some applications use of stabilized solutions is desirable, particularly where exact control of concentration is needed or where the oxidant must be exposed to damp conditions for several hours. In other applications potassium ferrate can be added as a solid directly to the impure water. When solid ferrate is used, sodium orthophosphate in a molar ratio of 1:1 may optionally be included with it. Inclusion of the second compound improves the stability of the ferrate and gives it more time to function. Sodium borates may also optionally be included with the ferrate to guard against excessively acid conditions in the water being treated. The ferrates operate best in an alkaline solution, pH 8.95 being optimum for potassium ferrate, but if excesses of the materials are used, somewhat more acidic conditions can be tolerated. Water treated with ferrates should, however, preferably be at least neutral, i. e. of a pH no less than 7.

Having described our invention,
We claim:

1. The method of destroying phenolic impurities in water which comprises supplying to said water potassium ferrate in amount at least sufficient to oxidize said phenolic impurities to inoffensive materials and at a pH of about 7–8.95.

2. The invention of claim 1 characterized in that the potassium ferrate is added as a solid.

3. The invention of claim 2 characterized in that the potassium ferrate contains an admixed member of the group consisting of soluble orthophosphates and triphosphates.

4. The invention of claim 3 characterized in that the potassium ferrate contains additionally a buffer salt such as a sodium borate.

5. The invention of claim 1 characterized in that the potassium ferrate is added as an aqueous solution.

6. The invention of claim 5 characterized in that the potassium ferrate is added as an aqueous solution containing additionally sodium orthophosphate and sodium borate.

7. The method of destroying phenolic impurities in water which comprises supplying to said water an alkali metal ferrate in amount at least sufficient to oxidize said phenolic impurities to inoffensive materials at a temperature of less than 50° C. and at a pH of about 7–8.95.

References Cited in the file of this patent

UNITED STATES PATENTS

| | | |
|---|---|---|
| 2,132,592 | Wells et al. | Oct. 11, 1938 |
| 2,141,189 | Lind | Dec. 27, 1938 |
| 2,194,438 | Wernlund et al. | Mar. 19, 1940 |
| 2,536,703 | Schreyer | Jan. 2, 1951 |

FOREIGN PATENTS

| | | |
|---|---|---|
| 604,804 | Great Britain | July 9, 1948 |

OTHER REFERENCES

Clark: The Determination of Hydrogen Ions, pp. 99 and 104–10, 2nd ed., 1922, repr. 1927, Williams and Wilkins Co., Baltimore.

Schreyer et al.: Analytical Chemistry, pp. 1312–14, vol. 23, No. 9, September 1951.

Beir: Serial No. 306,199 (A. P. C.), July 13, 1943.